April 29, 1930.   L. F. HEITZ   1,756,552

VALVE OPERATING MECHANISM

Filed Sept. 15, 1928

Inventor:
Leonard F. Heitz,

Patented Apr. 29, 1930

1,756,552

UNITED STATES PATENT OFFICE

LEONARD F. HEITZ, OF LAKE MILLS, WISCONSIN, ASSIGNOR TO THE CREAMERY PACKAGE MFG. COMPANY, OF CHICAGO, ILLINOIS, A CORPORATION OF ILLINOIS

VALVE-OPERATING MECHANISM

Application filed September 15, 1928. Serial No. 306,221.

The invention relates to mechanisms for opening and closing outlet valves in liquid containers, and more particularly relates to a valve operating mechanism for a milk weighing receptacle known in the dairy industry as a "weigh can."

A weigh can comprises a large receptacle or container supported on a weighing scale beam and adapted for dumping thereinto the individual dairy farmer's deliveries of milk to a dairy, the individual lots of milk being weighed in the receptacle and discharged into the dairy storage in rapid succession, to accommodate a waiting group of milk delivering dairy farmers. The quick emptying of the can of the successive lots after weighing necessitates a large outlet opening customarily controlled by a heavy valve of poppet type. The operation of opening the heavy valve against the weight of the liquid, with the heretofore commonly used hand lever pivoted on the wall of the can, requires considerable manual effort, the force of which seriously disturbs the balanced adjustments of the scales apparatus.

It is the principal object of this invention to provide an operating mechanism for a weigh can outlet valve which is easily and quickly operable without disturbance of the weighing apparatus, and of sturdy simple construction. Other objects and advantages will be apparent in the following detailed description of a preferred form of the invention as illustrated in the accompanying drawings.

Figure 1:
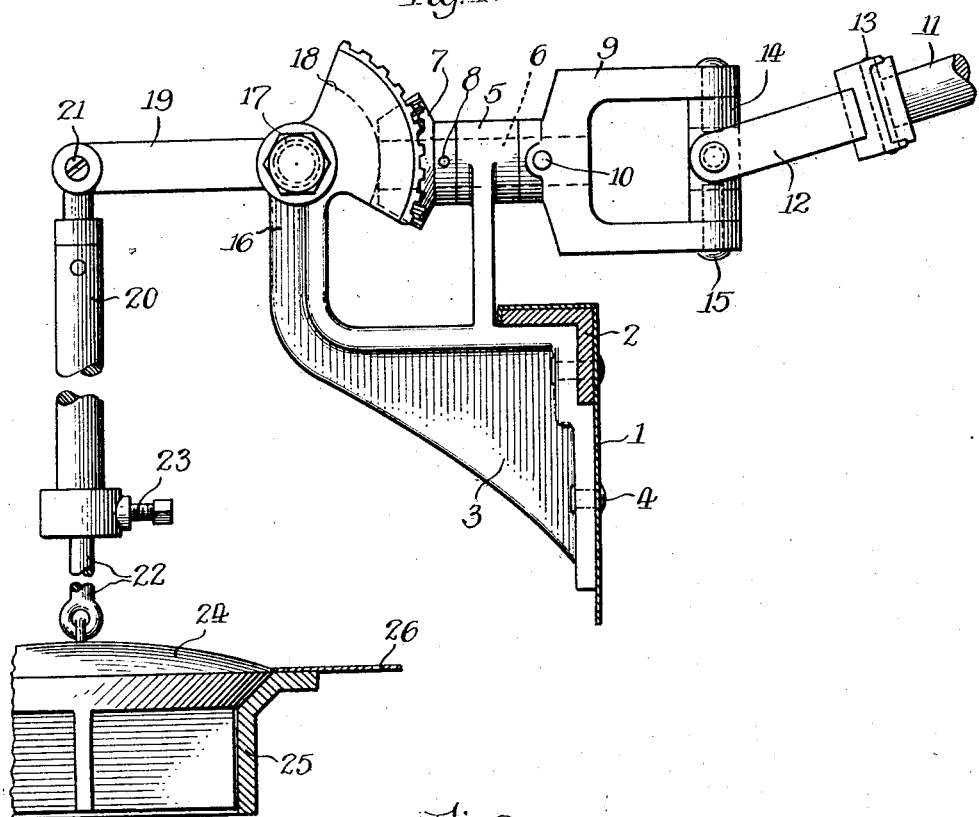
Figure 2:
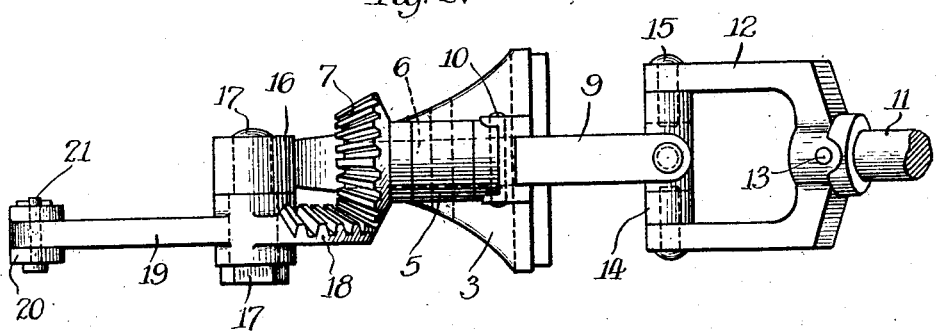

In the drawings, Fig. 1 represents a side view in elevation of the operating mechanism in its relation to the outlet valve and walls of a weigh can. Fig. 2 is a plan view of the same. The reference numeral 1 indicates a fragmentary portion of a side wall of a weigh can, preferably reinforced by an angle bar 2, upon which the mechanism is supported. A bracket 3, secured to the wall 1 as by rivets 4, carries a bearing 5 for a short shaft 6. A bevel pinion gear 7 is mounted upon the forward end of the shaft and secured thereto as by a pin 8. Upon the rear end of the shaft is mounted a yoke 9 secured to the shaft as by a pin 10. The yoke 9 forms part of a conventional universal joint between the shaft 6 and a hand shaft 11, and otherwise comprising the companion yoke 12, secured to the shaft 11 as by a pin 13, and the spider 14 having its four arms pivotally secured between the respective arms of the yokes 9 and 12, as by pins 15. The hand shaft 11 is swingable into any position convenient to the operator, and is provided with a handle (not shown) suitable for manually rotating the hand shaft and pinion.

An extension 16 of the bracket 3 supports a pivot stud 17 upon which is operatively mounted a bevel gear segment 18 in operative mesh with the pinion 7. Integral with the gear segment 18 is an oppositely extending arm 19 at the outer end of which a pendent bar 20 is pivotally connected as by a pin 21. The lower end of the bar 20 is preferably telescopic in form to receive an adjustable link 22 secured therewithin as by a set screw 23. The link 22 is flexibly connected to a valve 24 operable on a vertical axis and controlling the opening through an outlet sleeve 25 secured to the bottom wall 26 of the weigh can.

It will here be obvious that the weighing attendant may open and close the valve 24 by merely turning the hand shaft 11, the effort being multiplied through the gear pinion and segment to effect with ease the movement of the heavy valve, and without disturbing the weighing apparatus by which the can is supported.

I claim as my invention:

In combination with a weigh can having a valve controlled outlet, a bracket supported on said weigh can, a gear segment operatively mounted on said bracket and having an extended arm, a connection from said arm to said valve, a pinion in operative mesh with said gear segment, and a shaft having a bearing on said bracket and operatively supporting said pinion, said shaft having universally swingable means for manual rotation thereof.

In witness whereof I have hereunto attached my signature.

LEONARD F. HEITZ.